Sept. 29, 1964  L. D. ETHERINGTON  3,151,178
ISOBUTYLENE PURIFICATION
Filed June 27, 1960  2 Sheets-Sheet 1
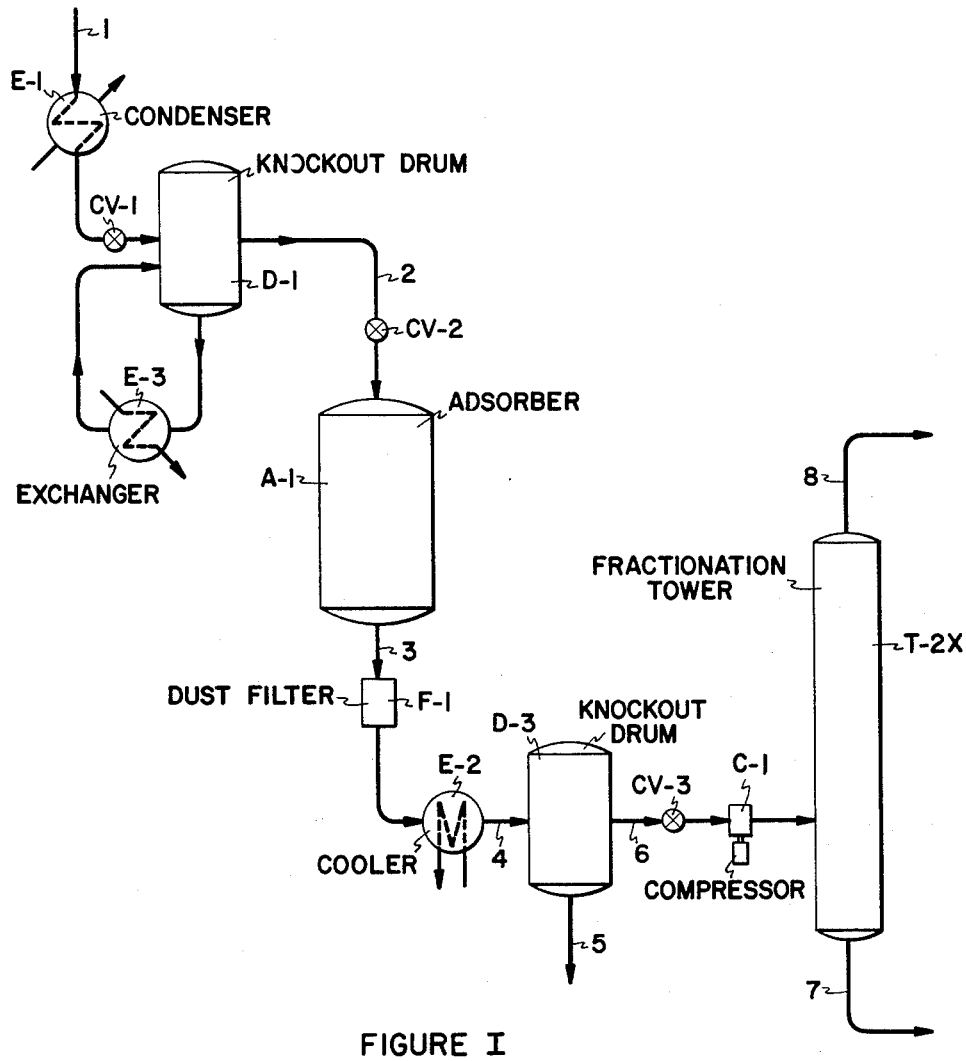
FIGURE I
Lewis D. Etherington Inventor
By Richard W. Nagel
Patent Attorney Sept. 29, 1964     L. D. ETHERINGTON     3,151,178
ISOBUTYLENE PURIFICATION
Filed June 27, 1960     2 Sheets-Sheet 2
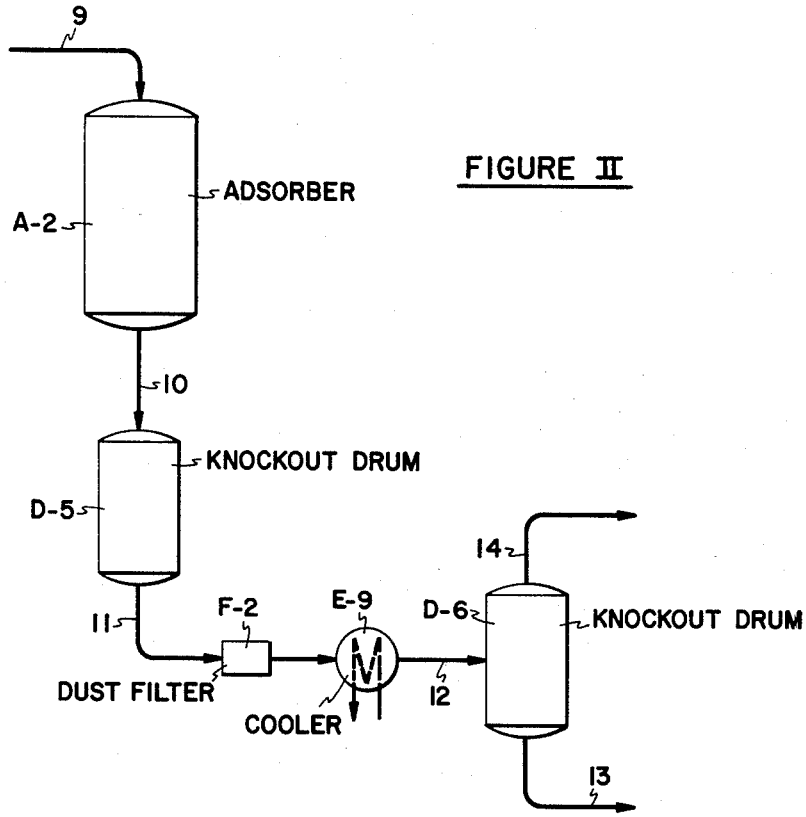
FIGURE II
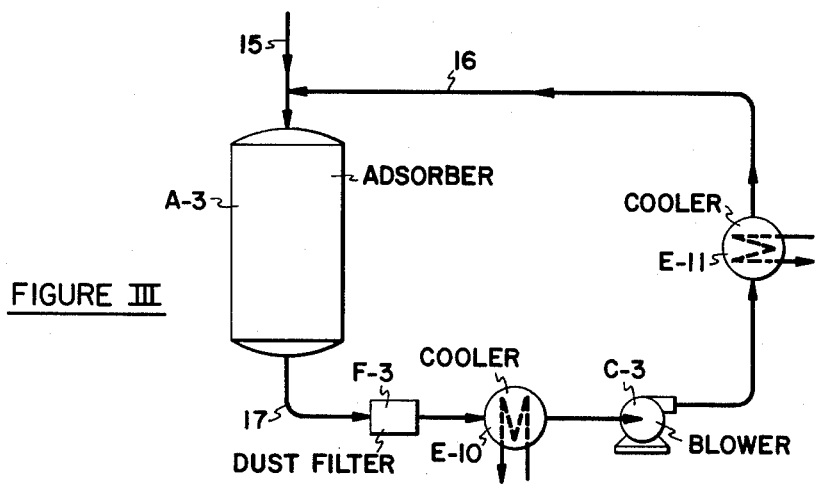
FIGURE III
Lewis D. Etherington Inventor
By Richard J. Nagel
Patent Attorney United States Patent Office 3,151,178
Patented Sept. 29, 1964

3,151,178
ISOBUTYLENE PURIFICATION
Lewis D. Etherington, Westfield, N.J., assignor to Esso Research and Engineering Company, a corporation of Delaware
Filed June 27, 1960, Ser. No. 38,915
6 Claims. (Cl. 260—677)

The present invention relates to a process for the purification of isobutylene streams. More particularly, the present invention relates to the preparation of isobutylene streams containing less than 0.1% normal butenes and adapted to be used as feed in the manufacture of synthetic high molecular weight polymeric resins such as butyl rubber, isobutylene-styrene rubbers, isobutylene-butadiene rubbers, and the like.

In the preparation of polymers of the butyl rubber and related types, it is essential to maintain a high state of purity of the isobutylene monomer, particularly with respect to contaminants such as diolefins and other olefins. For example, normal butenes act as poisons for the polymerization of isobutylene. The molecular weight of the polymer is thereby limited, and lower molecular weight polymer results. Ideally, the amount of normal butenes in the feed should be zero.

The most common commercial method of purifying isobutylene streams is to absorb the dilute stream of isobutylene in sulfuric acid; the isobutylene is preferentially absorbed from the other hydrocarbons. This is followed by desorption, caustic washing and water washing. The final step is a superfractionation to raise the isobutylene concentration from about 95 to 97% to about 99.3 to 99.5% by (a) removal of water; (b) removal of $C_5$ and heavier; and (c) removal of butene-2.

In spite of the large number of steps involved in the acid purification, this method does not remove butene-1 down to the desired trace quantity. Butene-1 and isobutylene boil too closely together to be sharply separated economically by superfractionation.

Recently, a highly effective hydrocarbon separation tool has become available in the form of molecular sieves, which are natural or synthetic crystalline adsorbents of the zeolite family having the property of selectively adsorbing molecules in accordance with their molecular cross-section. These sieves have poor openings of uniform size and will adsorb molecules having cross-sectional areas equal or smaller than a given size, but exclude larger diameter materials. Among the natural crystalline alumino-silicates having this molecular sieve property are chabazite and analcite. An excellent zeolite having a poor diameter of about 4 Angstrom units is described in a patent to Milton et al., U.S. 2,882,243, and is prepared by heating sodium silicate and sodium aluminate until the initially formed sodium alumino-silicate gel is crystallized to form a product corresponding to $Na_2O.Al_2O_3.2SiO_2.nH_2O$. This material, on activation, has a pore diameter of 4 Angstrom units, too small to admit any but very low molecular weight hydrocarbons. On base exchange with an alkaline earth metal salt, such as calcium chloride solution, the pores are widened to 5 Angstroms. The zeolite is thereafter pelleted with a binder, such as kaolin or other clay, and then activated by calcination in air at a temperature of about 700° to 1000° F. This zeolitic material is highly selective for adsorbing straight-chain hydrocarbons such as paraffins and olefins, and excludes branch-chain hydrocarbons. Thus, it would appear to be a highly effective selective adsorption agent for removing small amounts of normal olefins from the isobutylene streams here under consideration.

However, desirous as it is to employ these molecular sieves in treating isobutylene streams, their use has caused certain problems. It has been found that when sieves are contacted with isobutylene streams, substantial feed polymerization occurs to diisobutylene and higher polymers. The extent of this polymerization may be as high as 15 to 25% of the feed. It not only represents a loss of valuable product, but requires facilities for its removal, since the presence of isobutylene polymer is highly undesirable in feeds to the butyl rubber process. Furthermore, excessive polymer condenses and floods a portion of the sieve bed, interferes with the passage of feed gas through the sieve, reduces adsorption capacity, and liberates heat to promote more polymerization.

It is, therefore, an important object of the present invention to set forth an efficient process for preparing isobutylene streams of high degree of purity.

It is a still further object of the present invention to prepare a feed for synthetic butyl rubber by a process which does not polymerize isobutylene excessively.

Other and further objects and advantages of the present invention will become more apparent hereinafter.

In accordance with the present invention, it has been found that by controlling the adsorption conditions, polymerization can be minimized without sacrificing high adsorptive capacity.

It has been noted that one of the most significant factors affecting isobutylene polymerization, particularly when adsorbing olefins on a fresh or recently reactivated sieve, is temperature. During the first few cycles, sieve temperatures in excess of 130 to 150° F. result in undesired polymerization levels, which, as mentioned above, result in loss of valuable constituents and create flooding in the adsorption bed due to the production and condensation of high boiling material.

In accordance with one embodiment of the instant invention, it has been found that the excessively high temperature rise which occurs at the initial part of the cycle due to rapid adsorption can be minimized by controlling the superficial velocity of the isobutylene through the bed. Velocities between 0.2 and 1½ ft./sec. are advantageous, while those between 0.5 and 1.0 ft./sec. are preferred. At velocities lower than the above-defined broad range, adsorption and polymerization heats accumulate in the bed to such an extent that a high percentage of the olefins present are polymerized. On the other hand, excessively high velocities result in a pressure drop through the adsorption bed which increases the power or product compression requirements of the process. Over the preferred range of superficial gas velocities, the power requirements are not excessive. More important, however, the rate of heat transfer from sieves to gas is very good at these velocities, and the gas serves to remove polymerization and adsorption heats from the sieves efficiently to keep the solids temperature at a minimum, and thereby to minimize isobutylene polymerization.

In a further embodiment of the instant invention, it has been found that isobutylene gas residence time in the sieves bed (i.e., "space velocity") is quite critical in establishing the optimum balance between feel polymerization and fixed-bed cycle time. In other words, having fixed the superficial gas velocity for good solids-to-gas heat transfer, as explained above, it is important also to limit the gas residence time (i.e., to limit bed length). Otherwise, a substantial fraction of the gas can polymerize over a long bed section even at comparatively low average sieves temperature. With good heat transfer, the gas will absorb a large fraction of adsorption and polymerization heats, but the gas will become progressively warmer as it proceeds through the bed. Also, the temperature of a given bed section must necessarily always be fairly close to the temperature of the gas it "sees" during most of the adsorption period. Thus, if the gas stays in the bed too long, to become quite warm at the discharge end, the sieves will necessarily be quite warm also in the gas discharge section, and isobutylene polymerization may be excessive in this bed section.

It has been found that the desired maximum gas residence time corresponds to a minimum space velocity of about 0.5 to 2 pounds isobutylene feed gas per hour per pound of total sieves bed (0.5–2 w./hr./w.) at about 0–5 p.s.i.g. adsorption pressure, at 80–100° F. initial adsorption temperature for each cycle, and at 0.5–1 foot per second superficial gas velocity. The preferred space velocity is 1 to 1.5 w./hr./w. at the other conditions just described. When fixing space velocity at this level, the adsorption time per adsorption-desorption cycle will also be fixed for good n-butenes cleanup.

For example, at 1–1.5 w./hr./w. space velocity, 80–100° F. initial bed adsorption temperature for each cycle, 0–5 p.s.i.g. adsorption pressure, 0.8 wt. percent n-butenes in the isobutylene feed, and 90–95% removal of these n-butenes, the bed will become saturated with n-butenes in about 8 hours at the lowest sieves activity level before reactivation—and will then need to be desorbed. Under these conditions, and with sieves reactivation about every 40 cycles, the average isobutylene polymerization is less than 1% of that fed to the bed.

Larger sieves beds, for example, to provide a 24-hour adsorption period per cycle, would help to reduce labor costs with manual cycle changes. However, the high gas residence times with these large beds give excessive feed polymerization and polymer condensation problems, particularly with new or freshly reactivated sieves and at the beginning of each adsorption period.

In another embodiment of the instant invention, it has been found that a hot desorbed molecular sieve can be effectively cooled down to ambient or subambient temperature suitable for adsorption by employing a two-stage cooling process and without expensive refrigeration. In the first stage, a cooling gas, preferably a low molecular weight or moderately adsorbable paraffinic hydrocarbon such as isobutane, or methane in the form of clean natural gas, is introduced into the hot desorbed sieve and recycled through an external cooler which uses ordinary process water as coolant. The recycle cooling gas is maintained under pressures sufficient for the sieve to adsorb the gas to an extent of about 3–5% of the sieve's weight. After the bulk of the bed heat has been removed and the sieve temperature approaches the water coolant temperature (e.g., 100–120° F.), the recycle is discontinued and a vacuum of at least 710 to 730 mm. of mercury (i.e., 30 to 50 mm. total pressure) is applied to effect the second stage cooling. The application of the vacuum serves a two-fold purpose. Firstly, the adsorbed cooling gas is substantially removed from the molecular sieve, thereby preventing excessive dilution of the isobutylene product in the subsequent adsorption step; and secondly, the molecular sieve is further cooled. The additional sieve cooling occurs because of the high endothermic heat of desorption of the cooling gas. As is more clearly illustrated in the examples to follow, the evacuation of methane adsorbed to an extent of about 3–5% of the sieve's weight can effectively reduce the temperature of the molecular sieve from about 120° F. to below 80° F. by the above-mentioned desorption auto-refrigeration effect. At this low initial bed temperature for a new adsorption cycle, the extra high feed polymerization rate normally experienced on initiating adsorption is substantially reduced.

In still another embodiment of the instant invention, it has been found that by increasing the pressure of the adsorption process when the molecular sieve has undergone at least three and preferably five adsorption cycles, after reactivation or fresh sieves addition, it is possible to significantly increase the sieve capacity without incurring high polymerization losses. During the first few cycles with a freshly reactivated sieve or a freshly prepared sieve, it is desirable to adsorb at a low gauge pressure of about 2–5 p.s.i.g. in order to control isobutylene polymerization at a reasonable level. However, after about four to five adsorption-desorption cycles with adsorption carried out at near-atmospheric pressure, the sieves catalytic polymerization activity decreases about 80%, and its adsorption capacity decreases about 5–15% presumably due to the deposition of carbonaceous matter formed during high-temperature desorption. By raising the adsorption pressure after the first 4–6 cycles from 2–5 p.s.i.g. to 10–25 p.s.i.g., preferably to 10–15 p.s.i.g., the capacity of the sieve for n-butenes can be increased beyond that of fresh sieves at atmospheric pressure, whereas polymerization at the increased pressure is only about 40% of that for fresh sieves at atmospheric pressure. For example, the concentration of n-butenes in the usual isobutylene feed is about 0.5 wt. percent. At this concentration, the sieves capacity for n-butenes increases about 60% when adsorption pressure is increased from atmospheric to 15 p.s.i.g.

Since the polymerization activity is greatest during the first several cycles, and furthermore since increased pressure accelerates the polymerization, it is clearly undesirable to initiate the process with new sieves or freshly reactivated sieves at high gauge pressures. However, by raising the adsorption pressure at an intermediate cycle between sieve reactivations or replacements, the minimum sieve capacity can be increased. Thus, smaller equipment can be used for a given sieves reactivation frequency, or, less frequent reactivation is required for a given sieves plant size and sieves replacement costs will be decreased.

FIGURE 1 illustrates the adsorption cycle of the instant process. FIGURE 2 schematically shows the sieve apparatus during desorption. FIGURE 3 illustrates the molecular sieve adsorber during the cooling stage of the process.

Turning now to FIGURE 1, isobutylene vapor product overhead from an isobutylene feed fractionator (not shown) at a pressure of about 100 p.s.i.g. and 140° F. is fed to condenser E–1 at said pressure through line 1, and at least a portion is liquefied at about 100–120° F. with an indirect water coolant. The isobutylene is then reduced in pressure with control valve CV–1 to about 7–20 p.s.i.g. At least a portion of the liquid vaporizes with the pressure reduction and the total feed is cooled to 40–70° F. due to the liquid evaporation. Isobutylene feed vapor is separated from any residual liquid in knockout drum D–1. Any residual liquid feed portion in D–1 may be used as refrigerant in exchanger E–3, for example, to chill the sieves recycle cooling gas for more thorough sieves cooling after desorption, or to supplement the cooling achieved by cooling gas desorption. The refrigerant feed portion after vaporization in E–3 combines with the remaining feed vapor in D–1. The combined sieves feed vapor is reduced in pressure with control valve CV-2 to about 2-15 p.s.i.g., depending largely on the degree of sieves deactivation, and is then passed into the top of adsorber A-1 through line 2. The feed rate is regulated in such a manner that the superficial velocity through the molecular sieve bed in adsorber A-1 is between 0.2 ft./sec. and 1.5 ft./sec. It is preferred that the superficial velocity be from 0.5 to 1 ft./sec. Furthermore, it is preferred that the so-called space velocity not be below about 1 lb. isobutylene feed vapor per hour per lb. sieves bed. At these conditions and a given hourly feed gas rate, adsorber A-1 cross-section and bed length will be substantially fixed.

Prior to the introduction of the feed, it is desirable that the molecular sieve bed be at about 80° F., particularly during the first 3-6 cycles after sieves replacement or reactivation. When the isobutylene feed comes into initial contact with the sieve bed, a sharp increase in temperature occurs due to the high initial heat of adsorption and olefin polymerization. However, at the gas feed temperature, adsorption pressure, superficial velocity, and space velocity ranges prescribed, the isobutylene feed acts as a good cooling medium, takes up adsorption and polymerization heats without too great a temperature rise, and prevents the molecular sieve bed from rising to a temperature in excess of 150° F. and usually to no higher temperatures than 130° F. Higher temperatures would result in excessive olefin polymerization. The pressure at which the initial feed stream is introduced is preferably just slightly over atmospheric pressure when the sieves are fairly new or recently reactivated. Higher pressures at this point would also accelerate olefin polymerization. Subatmospheric pressures, on the other hand, may result in air leakage into the system and excessive isobutylene vapor product compression requirements. The effluent stream leaves adsorber A-1 through line 3, is passed to sieves dust filter F-1, then to product cooler E-2 and thence through line 4 to polymer knockout drum D-3, wherein any polymer condensed in E-2 is removed through line 5. The isobutylene vapor containing slight traces of polymer is removed from knockout drum D-3 through line 6, passed through constant-pressure control valve CV-3, then to compressor C-1, and next to the product rerun fractionating tower T-2X, wherein any residual polymer may be removed at the bottom of the tower through line 7. The essentially pure isobutylene product is removed overhead from tower T-2X through line 8, usually in liquid form. After the molecular sieve bed in tower A-1 is desorbed as will be described below, it is again ready for adsorption. After at least four, preferably five, adsorption-desorption cycles, the molecular sieve bed begins to show some loss in capacity. At the same time, the polymerization catalytic activity of this bed also decreases. Hence, at the end of four, preferably five, cycles the pressure in adsorber A-1 is increased to 5 to 25 p.s.i.g., preferably to 10-15 p.s.i.g. This increased pressure increases the capacity of the molecular sieve without aggravating the polymerization activity to an inoperable level. The adsorbent may be used for about 40-45 cycles before reactivation is necessary.

FIGURE 2 shows the desorption of a saturated molecular sieve bed. An inexpensive and temperature-stable gas of low to moderate molecular weight, for example, clean natural gas, is introduced into the top of a saturated sieves bed in tower A-2 through line 9. The temperature of the gas should be in the order to 500-750° F., preferably about 750° F. to minimize the quantity of once-through heating gas, to ensure good polymer desorption and to minimize sieve catalytic activity which promotes isobutylene polymerization. This high temperature can be achieved with a gas furnace, a dowtherm furnace, or by the use of an electric heater in conjunction with a steam heated exchange unit at a point in line 9 upstream from tower A-2. As the natural gas proceeds through the bed initially, the front of the bed is heated to a temperature substantially equal to that of the incoming natural gas, and eventually the total bed approaches this temperature. In addition, the natural gas reduces the partial pressure of the adsorbed normal butenes and isobutylene polymer to essentially zero. This results in the stripping of the normal butenes and polymer from the bed. The heating gas is preferably downflow in the bed to facilitate drainage of polymer which desorbs in the hot front bed section during the initial heating and may condense in the cold discharge section before temperature breakthrough. Due to the high temperature level, cocurrent desorption is adequate. That is, the hot desorption gas may pass through the bed in the same direction as the adsorption feed gas. Stripping is continued for about 30 minutes after temperature breakthrough on the discharge gas to ensure good heating of the discharge end of the bed and, therefore, to ensure good desorption of this bed section. The discharge heating gas exiting through line 10 passes through drum D-5 for knockout of some sieve fines and any polymer condensate. Next, the discharge gas, varying in temperature from about 120 to 750° F., passes through line 11 through sieves dust filter F-2, to gas cooler E-9 and thence through line 12 to knockout drum D-6, wherein desorbed polymer condensate is knocked out through line 13. The used natural gas exits from D-6 through line 14 and may be discharged into a burner line (not shown) for economical use as fuel. All the water in a once-through heating gas adsorbs and accumulates in the cold discharge bed sections, and substantially the total quantity may be released during the temperature breakthrough period. Allowance is made for some water condensate in D-6 to wet the polymer condensate. When clean, high pressure natural gas is used for heating gas, the water content of this gas runs about 30 parts per million, and the total water in the total once-through heating gas quantity per cycle is not very significant.

FIGURE 3 shows the adsorber in the cooling period of a fixed-bed process. This period immediately follows the heating-desorption operation just described. The pressure of the hot system is reduced if the desired cooling pressure is lower than the desorption pressure. Cooling gas such as isobutane or clean recycle natural gas is introduced into adsorber A-3 through lines 15 and 16, and the pressure is adjusted to the level required for the desired gas adsorption and sieves auto-refrigeration to be achieved after bulk cooling is completed. When natural gas is used for cooling, the desired cooling pressure is preferably 50-150 p.s.i.g. After cooling gas flows through the bed, it serves to cool the molecular sieves to a temperature of about 120°. Due to the high pressure and reduced temperature, a significant amount of methane, i.e. at least 3 wt. percent on sieves is adsorbed. The exiting gas leaving the adsorber A-3 through line 17 is recycled via sieves dust filter F-3, cooler E-10 utilizing water coolant, blower C-3, cooler E-11 utilizing boiling liquid isobutylene feed as refrigerant, and back to adsorber A-3. Additional (makeup) cooling gas may be added through line 15 to prevent a pressure reduction due to gas adsorption. Downflow gas cooling is used to permit high gas rates without sieves pellet attrition and simplified design. Another advantage of passing the cooling gas downflow (i.e., in the same direction as the heating gas) is that the hot discharge end of the bed continues to be desorbed until the cold temperature breakthrough on the discharge cooling gas occurs. This desorption effect provides better removal of normal butenes from isobutylene during the adsorption period of the cycle when feed gas is also downflow.

After the bed is cooled to about 100-120° F., the bed pressure is reduced to 30-50 mm. Hg abs. with a steam jet injector or compressor (not shown). This high vacuum causes desorption of the residual methane down to about 0.15 wt. percent on sieve. Desorption effected by evacuation of the natural gas effectively cools the bed to 75 to 90° F. when the gas cooling pressure is 50-150 p.s.i.g. The residual methane not removed by vacuum is all desorbed in about the first 2% of the isobutylene feed during the next adsorption run, and in about 3 vol. percent concentration. Ethane and heavier hydrocarbons from the natural gas are not desorbed efficiently by the vacuum, and are stripped by the feed in about 0.3 vol. percent concentration maximum during the first quarter of the adsorption run. These inert materials may be purged from the product via the reflux condensation drum on the fractionator T–2X for polymer removal. Also, in butyl rubber operations, provision is made to purge difficultly condensable gases. Thus, sieved isobutylene dilution by a small amount of light paraffin gas is not serious in butyl rubber operations, since the paraffins are not polymerization poisons.

A nonadsorbable recycle cooling gas such as high-purity nitrogen may be used at reasonable cost to minimize sieved product dilution by desorbed cooling gas. The beneficial auto-refrigeration desorption effect cannot be obtained with a gas such as nitrogen except at extremely high pressures. However, as explained above, a liquid isobutylene feed portion may be used as indirect refrigerant to chill recycle cooling gas after water cooling, such that the chilled gas cools the bed to the desired low temperature for initial adsorption, i.e. refrigeration by the liquid feed portion can be used to substitute for or supplement the sieves chilling effected by desorption of a poorly adsorbable cooling gas such as recycle nitrogen. After evacuation, the desorbed sieve may be repressured quickly with feed, and the isobutylene feed flow initiated immediately, thus starting another adsorption run. However, when repressuring quickly, it is important to start withdrawing feed gas from the sieves bed at a good rate as soon as feasible in order to get good heat transfer between solid and gas, and thereby utilize the high cooling capacity of the feed efficiently to keep sieves temperature and the isobutylene polymerization rate down. This is important because the polymerization rate is highest at the beginning of an adsorption run due to the absence of polymer on the sieves, i.e., as polymer forms and adsorbs on the sieves, the adsorbed polymer depresses the formation of additional polymer due to the mass action effect.

Another feature of this invention is to take advantage of the beneficial effect of adsorbed polymer to depress further polymerization. Immediately after sieves evacuation for desorption of cooling gas, feed isobutylene vapor is introduced slowly to gradually raise the bed pressure from about 30–500 mm. Hg to about 2–15 p.s.i.g. adsorption run pressure. During this period, no isobutylene product is withdrawn from the bed. However, polymerization rate will be quite slow during the low intermediate pressure range of, say, 50–200 mm. Hg, and the polymerization rate can be controlled by pressure to avoid an excess rate of bed temperature rise. Isobutylene will polymerize slowly and will adsorb almost completely as it forms. When the sieves temperature rises from an auto-refrigerated value of about 80° F. to about 130° F. due to heat of polymerization, about 3 to 4 wt. percent polymer on sieves will be adsorbed. This quantity is enough to significantly depress further polymerization, but is not enough to cause flooding. At this point, the bed pressure is raised to the operating pressure rapidly, and feed flow is initiated to reach the operating feed rate immediately. Polymer at the feed end of the bed will desorb somewhat due to the feed stripping action, tending to increase polymerization. However, this is not so critical since the feed end receives the full cooling effect of the feed gas, which offsets the low adsorbed polymer quantity. Polymer desorbed at the feed end before equilibrium polymer adsorption is established will redeposit in the downstream bed section, and protect the sieves which do not receive the full feed gas cooling effect. A gradual pressuring of the evacuated bed with feed gives a gradual increase in bed temperature with less danger of hot spots and thermal shock (attrition) of the sieve pellets.

Many modifications can be made of the instant invention without departing from its scope. For example, by drawing intermittently on stored feed and using a very high feed rate during the initial period of adsorption and then subsequently reducing the feed rate to replace that taken from storage, the maximum polymer content of the exit feed can be reduced to decrease the polymer condensation and flooding tendency. This procedure is effective since molecular sieves catalyze the polymerization reaction most markedly during the initial part of the cycle and soon decreases to a tolerable level. Thus, the larger polymer quantity formed during the initial adsorption period is diluted by the excess feed.

It has been found that a benefit similar to that just described for varying fresh feed rate may be obtained by incorporating recycle of sieved feed during the initial part of an adsorption run. Recycled product added to fresh feed will dilute the excessive polymer formed at the beginning of the run and help to prevent polymer condensation and flooding. However, in order to make the recycle stream an effective diluent, it is necessary to remove at least a portion of the polymer from the recycle (particularly the heavier polymer fraction such as trimer, which has the highest condensation tendency) before the recycle joins fresh feed. For example, the heavier polymer fraction may be removed effectively by chilling the recycle stream. A liquid fraction of the fresh feed may be first vaporized as convenient refrigerant for chilling the recycle. It is not necessary to remove all the lighter polymer fraction, such as isobutylene dimer, from the recycle since this fraction does not condense so easily to flood the sieves bed. In fact, some residual dimer in the recycle joining the fresh feed is beneficial in that it reduces the above-mentioned stripping action of the feed entering the bed and depresses desorption of polymer, particularly dimer, at the feed end. Thus, depressed dimer desorption reduces further polymerization at the feed end and thereby reduces polymerization heat at the feed end.

The recycle isobutylene stream dilutes n-butenes in the fresh feed as well as polymer. This dilution may reduce sieve capacity for n-butenes, depending on the fresh feed purity and adsorption pressure. However, it is not necessary or beneficial to use recycle except for an initial small portion of the total adsorption period. Thus, recycle is usually discontinued before n-butenes breakthrough at the reduced n-butenes adsorption capacity. When recycle is discontinued, the capacity of the saturated sieves in the front section of the bed increases and more n-butenes begin to adsorb in this section. Thus, the total bed capacity at the end of the adsorption run (n-butene breakthrough) is only slightly lower than when no recycle is used. Furthermore, the use of recycle or high initial fresh feed rate of high cooling capacity serves to maintain the adsorption bed at a lower temperature. Since adsorption of normal butene and dimerization of the isobutylene are both exothermic reactions, the molecular sieve bed rapidly heats up to high temperatures if not cooled. These high temperatures are very detrimental to the process since increased isobutylene polymerization (e.g., to dimer, trimer, etc.) occurs and the adsorptive capacity of the sieve is reduced. By processing the feed at higher initial rates, or by recycling cooled sieved product, the heat formed is more rapidly and more completely removed from the sieve bed with the outgoing isobutylene.

A similar result can be achieved by diluting the feed with an inert gas, e.g. natural gas, during a relatively short time at the beginning of the adsorption period. The amount of dilution can gradually be decreased as the polymerization rate slows down and the initial polymerization heat is removed from the bed. However, the temporary use of inert gas dilution of the feed might require that the initial product portion be discarded or subjected to further purification.

In another modification of the instant invention, the adsorption bed may be broken up into two to four multiple sections, preferably about three sections. In using this procedure, the contaminated isobutylene is first fed to one section until the sieves are saturated; this section is then isolated from the feed for desorption, and the feed is then shifted to a second freshly desorbed section, etc. Thus, only one bed section is in contact with isobutylene feed at a given time. The total polymerization rate is directly proportional to the total weight of sieves in contact with isobutylene feed. Therefore, the fraction of feed polymerized is reduced. For example, if a given total sieves bed is broken up into three isolated bed sections, the fraction of the feed polymerized will be about one-third that when the same total sieves quantity contacts all the feed in a single bed. All of the bed sections, isolated during adsorption, may be desorbed or reactivated in series as a single bed. This eliminates most of the disadvantages of multiple beds, since there are more separate steps in desorption and reactivation than in adsorption. Thus, in other words, during adsorption there is very little labor involved in cutting feed in and out of the several bed sections. However, there would be considerable extra labor or complexity in an automatic cycle changing system if all bed sections were desorbed and reactivated separately. Thus, it is usually preferred to desorb and reactivate all the bed sections simultaneously as connected bed sections, since there is no objectionable consideration of polymerization during this operation. The same total feed quantity may be treated per cycle with multiple bed sections, with no loss in capacity with the same total bed quantity, and with about the same total cycle time, but with a substantial decrease in the fraction of feed polymerized. Or, a much larger total sieves quantity may be used in multiple bed sections to increase the cycle time and the total feed quantity treated per cycle, and to reduce the manual labor required, without increasing the fraction of feed polymerization that would occur when increasing the sieves quantity with only one bed section. When the bed is broken up into several sections, it is convenient to recycle feed gas around each bed through a cooler. Thus, the cooled recycle gas would give the equivalent of a high (net) cool feed rate to drop the initial adsorption bed temperature which tends to rise rapidly. Since only one bed section is fed at a time, the same recycle gas cooler could be used in each bed section. Though the recycle tends to decrease separation efficiency, the selectivity between key components is so high that good clean-up of normal butenes can still be achieved without increasing the bed size, particularly if the recycle isobutylene is discontinued at an intermediate point in the adsorption run on each bed section when the high initial feed polymerization rate has abated.

EXAMPLE 1

To illustrate the advantage of increasing the adsorption pressure after five cycles, the following run was made. Isobutylene containing 0.5% n-butenes was introduced into a freshly regenerated sieve. During the first five cycles, operation was carried out at slightly above atmospheric pressure; during the first cycle at atmospheric pressure, about 5% of the feed polymerized. The remaining 40 cycles were carried out at 15 p.s.i.g. During the last (i.e., fifth) low-pressure adsorption cycle, the sieve capacity was 5.7 wt. percent n-butenes on the sieves. This showed a five percent decrease in capacity from the 6 wt. percent capacity of a fresh sieve at atmospheric pressure. When the pressure was increased at the start of the sixth cycle, the sieve capacity increased appreciably to 8 wt. percent and feed polymerization was 2%; after the completion of an additional 39 cycles, the capacity decreased to 5.6 wt. percent. This 5.6 wt. percent capacity should be compared to the 4.2 wt. percent n-butenes capacity experienced after 45 cycles when atmospheric pressure conditions were employed throughout. Hence, it can be seen that the capacity improvement by increasing the pressure in accordance with this invention is about 33%. At the same time, the feed polymerization averaged less than 1% for the 45 cycles between sieve reactivations. This capacity improvement permits the reduction of the bed size and desorption equipment for the same cycle time and number of cycles between regenerations and, in addition, reduces sieve make-up requirements by 25%.

The increased pressure increases sieve dimerization modestly, and, therefore, does not interfere with the process. More specifically, in this run the degree of feed dimerization of the first elevated pressure cycle is only 30%–40% of that of the first low pressure cycle. On the basis of 45 total cycles, the percentage of dimer produced averaged less than 1% (i.e., roughly 0.5%) of the total isobutylene fed to the sieves bed.

On the basis of 8-hour adsorption runs (16 hours per cycle) and 45 cycles between regenerations, it is only necessary to reset the pressure about once a month. Clearly, this is a minor operating inconvenience.

EXAMPLE 2

To illustrate the highly effective cooling that can be obtained by recycling the cooling gas under pressure and subsequently evacuating the adsorbed cooling gas, the following calculations were made with available sieve isotherm capacity and sensible heat data. A desorbed molecular sieve bed at 750° F. was cooled to an average temperature of about 120° F. by contact with natural gas at a temperature of 110° F. and a pressure of 100 p.s.i.g. After temperature breakthrough, the sieve was evacuated to about 30 mm. Hg by use of a steam jet. The evacuation reduced the methane adsorbed on the sieve to a calculated value of from 0.3% to 0.15 wt. percent on sieve. The calculated temperature drop during evacuation is from 120° F. Tto less than 80° F. This should be compared with atmospheric cooling wherein, after evacuation of residual methane, the estimated temperature was reduced to only 105° F. The subsequent isobutylene polymerization when feed is initiated to the 80° F. bed is much less than when initiated to the 105° F. bed.

EXAMPLE 3

Table 1 following gives data on isobutylene purification with molecular sieves. Isobutylene vapor of 99.4–99.6 wt. percent purity and containing 0.43 wt. percent n-butenes was passed through an insulated, adiabatic cylindrical tower containing a bed of Linde 5A sieves. As indicated by the complete data conditions described in the table, the feed gas was passed through the fixed sieves bed until the n-butenes removed from isobutylene and adsorbed on the sieves averaged 90–95% of the total n-butenes fed to the sieves. This comprises the adsorption period of a cycle. The sieves were then heated to 700–750° F. by passing hot natural gas (largely methane) through the sieves and desorbing the n-butenes and isobutylene polymer with the hot gas at this temperature. Cold natural gas was then used to cool the sieves. After cooling, the methane was evacuated at 50 mm. mercury pressure, and flushed out further with nitrogen at atmospheric pressure (760 mm. mercury). This operation completed a fixed bed cycle. Isobutylene feed was then initiated for the next cycle.

The significant observation to be made from the data is the low rate of capacity decrease per cycle compared to the rapid decrease in feed polymerization per cycle during the first few cycles after charging fresh unused sieves to the adsorption column; e.g., note that the sieves capacity for n-butenes decreases about 4% during the first 6 cycles, whereas the fraction of feed polymerized per cycle decreases almost 90%.

Table 1

ISOBUTYLENE PURIFICATION WITH MOLECULAR SIEVES

[Decline in sieves capacity for n-butenes and in isobutylene polymerization with repeated adsorption-desorption cycles and high temperature desorption]

| Adsorption-Desorption Cycles | Fresh Sieves | 2 | 3 | 4 | 5 | 6 | 12 | 40 | Avg. |
|---|---|---|---|---|---|---|---|---|---|
| Sieves n-Butene Capacity: | | | | | | | | | |
| Wt. percent on Sieves | 5.2 | | | 5.1 | | 5 | 4.8 | 3.6 | 4.4 |
| Percent of Fresh Sieves Capacity | 100 | | | 97.6 | | 96 | 91 | 68 | 84 |
| Isobutylene Polymerization: | | | | | | | | | |
| Percent of Total Feed | 5.7 | 2.2 | 1.2 | 0.9 | .75 | .67 | .08 | .08 | 0.4 |
| Percent Rel. to Fresh Sieves | 100 | 39 | 21 | 16 | 13 | 11 | 1.5 | 1.5 | 7 |

Adsorption Conditions.—Space velocity (w./hr./w.)=6 lbs. isobutylene feed per hour per pound of sieves. Superficial gas velocity=0.17 feet per second at the gas feed entry; 0.43 wt. percent n-butenes in feed isobutylene; total feed per lb. sieves per cycle (w./w./cycle)=12.7 Fraction of n-butenes removed from feed=90-95% average for each cycle. Feed gas and initial sieve temperature, each cycle,=120–125° F. Sieve bed=1 inch diameter x 3.5 inches long.* 5A Linde sieves, ⅛ inch pellet size. Sieves desorbed at 700–750° F. with 4 standard cubic feet (4 s.c.f.) natural gas per lb. sieves. Adsorption at atmospheric pressure.

* 35.3 grams of sieves in the bed.

EXAMPLE 4

Following the laboratory investigations of Table 1, the spent sieves were removed from adsorption column bed and replaced with an equal quantity of fresh sieves. These fresh sieves were first dried at 700–750° F. as were the Table 1 fresh sieves, cooled, and then subjected to isovelocity was kept at a lower value of 2 w./hr./w. The adsorption conditions were substantially identical with those of the Table 1 data except that feed gas space velocity was kept at a lower value of 2 w./hr.w. The lower space velocity resulted in a much higher fraction of feed polymerized, and higher bed temperatures, as shown in Table 2 following. The high feed polymerization caused excessive polymer condensation on the bed, and in fact a large part of the bed flooded with polymer condensate.

Table 2

EFFECT OF ISOBUTYLENE FEED GAS SPACE VELOCITY ON FRACTION OF ISOBUTYLENE POLYMERIZED AND POLYMER CONDENSATION.

| Cycle | 1st (Fresh Sieves) (See Table 1) | 1st (Fresh Sieves) |
|---|---|---|
| Feed Gas Space Velocity, w./hr./w.[1] | 6 | 2 |
| Superficial Feed Gas Velocity, ft./sec. | 0.17 | .055 |
| Bottom (Discharge) Sieve Bed Temperature After 1 Hour of Adsorption, °F. | 160 | 180 |
| Fraction of Total Isobutylene Feed Polymerized, percent | 5.7 | 23 |

[1] W./hr./w.=lbs. isobutylene per hour (feed rate) per lb. total sieves in adsorber bed.

EXAMPLE 5

The experiments corresponding to the data of Table 1 were repeated with fresh sieves (1st cycles) only, with all conditions the same except that space velocity was lowered to 1 w./hr./w. and bed length was increased to 7 inches to permit bed cooling coils for constant sieves temperature control. Fresh sieves adsorption was carried out at three temperatures, and the results on isobutylene feed polymerization are given in Table 3. Feed polymerization increases appreciably with increasing temperature.

Table 3

| Cycle | Fresh Sieves for All Runs | | |
|---|---|---|---|
| W./hr./w. | 1 | 1 | 1 |
| Adsorption Pressure | ([1]) | ([1]) | ([1]) |
| Sieves Temperature During Adsorption, °F. | 75 | 150 | 200 |
| Fraction of Feed Polymerized, percent | 9 | 22 | 33 |

[1] Atmospheric.

EXAMPLE 6

The laboratory studies corresponding to Table 1 were repeated with a vertical 4-inch diameter adsorption tower containing a 50–60 inch bed of 5A sieves amounting to 20 lbs. weight. Feed gas was preheated with a coil at the feed end (top) of the adsorber shell which did not contain sieves. The results from these experiments are shown in Table 4 below. Except for the larger bed and varying feed gas inlet temperature, the adsorption and desorption conditions were substantially the same as listed in Table 1. Comparison of cycles 6, 22 and 23 show an undesired effect of high adsorption pressures on isobutylene feed polymerization. However, moderate increases in adsorption pressure (comparison of cycles 1 and 6) are not objectionable after the first 4–6 cycles, even when starting with fresh sieves.

Table 4

EFFECT OF ADSORPTION PRESSURE AND SIEVE LIFE (NO CYCLES) ON POLYMERIZATION OF ISOBUTYLENE FEED

| Cycle | 1 | 3 | 4 | 6 | 22 | 23 |
|---|---|---|---|---|---|---|
| Space Velocity, w./hr./w. | 6 | 6 | 6 | 6 | 1 | 1 |
| Feed Gas Temp., °F. | 180 | 139 | 128 | 108 | 130 | 140 |
| Adsorption Pressure, p.s.i.g.[1] | 0 | 0 | 8 | 13 | 27 | 75 |
| Percent of Feed Isobutylene Polymerized | 7.4 | 2.3 | 1.6 | 0.57 | 0.7 | 7.9 |

[1] Pounds per square inch, gauge.

EXAMPLE 7

Experiments with the equipment of Table 1 were repeated with fresh sieves (1st cycle) only, with all adsorption conditions the same except adsorption pressure. The adiabatic bed temperatures, of course, increased with pressure as indicated by the data of Table 4. However, sieves capacity for n-butene increased appreciably with pressure, and a much larger quantity of feed could be added per cycle with increasing pressure, while realizing 90–95% removal of n-butenes from the total cycle feed. This benefit is shown by the data of Table 5 following. At high pressure, the amount of feed per cycle that can be purified with a given weight of sieves (w./w./cycle) is increased significantly with increasing pressure. However, it is necessary to find means of checking feed polymerization which has been shown to increase also with increased adsorption pressure.

Table 5
BENEFIT OF INCREASED SIEVES CAPACITY WITH INCREASED ADSORPTION PRESSURE

| Cycle | Fresh Sieves (See Table 1) | Fresh Sieves | Fresh Sieves |
|---|---|---|---|
| Adsorption Pressure, p.s.i.g. | 0 | 19 | 34 |
| Sieves Capacity for n-butenes [1] | 5.2 | 8 | 10 |
| W./w./hr. | 6 | 6 | 6 |
| W./w./cycle | 12.7 | 19.5 | 24 |

[1] Wt. percent n-butenes on sieves at end of adsorption period with 90–95% of n-butenes removed from the total cycle feed.

EXAMPLE 8

It is possible to vary feed gas superficial velocity independent of space velocity by changing bed length. The data in Table 6 following indicate that high superficial velocity (long bed length) at a given space velocity allows the feed gas to cool the sieves more efficiently and keep down polymerization. Previous data have shown that lower space velocity and higher adsorption pressure both promote increased polymerization. In spite of this handicap, the 50–60 inch bed length gives reduced polymerization. This is attributed to the high superficial gas velocity (.47 ft./sec.) for the longer bed, in comparison to 0.055 ft./sec. for the shorter column. Note that the exit bed temperature is cooler for the longer bed.

Table 6
EFFECT OF SUPERFICIAL FEED GAS VELOCITY

| Cycle | 1st (Fresh Sieves) | |
|---|---|---|
| Bed Length, Inches | 3.5 | 50–60 |
| Adsorption Pressure, p.s.i.g. | 0 | 15 |
| Space Velocity, w./hr./w. | 2 | 1 |
| Superficial Velocity, ft./sec. | .055 | 0.47 |
| Sieves Bed Temperature at Gas Discharge End, °F. | 180 | 166 |
| Percent Feed Polymerization | 23 | 16 |

Adsorption Conditions.—Substantially same as for Table 1; i.e., 12–15 w./w./cycle, ⅛" pellets of 5A sieves, 120–125° F. initial bed temperature, 100–120° F. feed gas temperature, insulated adsorber, fresh sieves predried at 700–750° F., etc.

EXAMPLE 9

Previous data have shown the beneficial effect of lower sieves temperature in reducing isobutylene feed polymerization, particularly at the start of an adsorption run, to check polymerization when there is little adsorbed polymer and before the feed gas cooling effect can be felt. When adsorbable gas such as methane is used to cool hot desorbed sieves, vacuum desorption of methane from moderately cooled sieves (e.g., at 120° F.) can be used to further cool the sieves prior to initiating the next adsorption run. This beneficial cooling effect is shown by data and calculations in the following Table 7.

Table 7

| | |
|---|---|
| Average sieves temperature after cooling with 115° F. methane. | 120° F. |
| Pressure during sieves cooling with 115° F. methane. | 50–100 p.s.i.g. |
| Methane adsorbed during 115° F. cooling. | At least 3 wt. percent on sieves. |
| Endothermic heat of methane desorption | Approximately 250 B.t.u. per lb. of methane. |
| Calculated cooling during vacuum desorption of methane from one lb. of sieves. | .03×250=7.5 B.t.u. |
| Sensible heat capacity of sieves | Approximately 0.2 B.t.u. per lb. per °F. |
| Calculated sieves cooling during methane desorption. | 7.5÷0.2=37.5° F. temperature drop. |
| Calculated sieves temperature after methane desorption. | 120−37.5=82.5° F. |

What is claimed is:

1. The process for preparing a substantially pure isoolefin stream which comprises introducing a feed consisting essentially of isoolefin and a minor proportion of normal olefin into a 5A crystalline aluminum silicate sieve adsorption zone said zone containing said 5A sieve selected from the group consisting of new sieve and freshly regenerated sieve, at a superficial feed velocity of 0.2 to 1.5 ft./second, said adsorption zone being at a temperature of between about 80 and 150° F., maintaining the pressure in said zone of from 0 to 5 p.s.i.g., adsorbing normal olefins in said adsorption zone and withdrawing substantially pure isoolefin stream.

2. The process for preparing a substantially pure isobutylene stream which comprises introducing a feed consisting essentially of isobutylene and a minor proportion of normal butenes into a 5A crystalline aluminum silicate sieve adsorption zone said zone containing said 5A sieve selected from the group consisting of new sieve and freshly regenerated sieve at a superficial feed velocity of 0.2 to 1.5 ft./sec., at a temperature of between about 80 and 150° F., a feed space velocity of about 0.5 to 2 w./hr./w., maintaining a pressure in said zone of from 0 to 5 p.s.i.g., adsorbing normal butene in said adsorption zone, and withdrawing a substantially pure isobutylene stream.

3. A process for preparing an isobutylene stream containing less than about 0.1% n-butenes, comprising introducing a feed consisting essentially of isobutylene and about up to 0.8 wt. percent of n-butenes into a 5-A crystalline aluminum silicate sieve adsorption zone said zone containing said 5A sieve selected from the group consisting of new sieve and freshly regenerated sieve, said adsorption zone being at an initial temperature of less than 90° F.; maintaining the space velocity of said feed from about 0.5 to 2 w./hr./w. and a superficial feed velocity of from about 0.2 to 1½ ft./sec.; maintaining a pressure in said zone of from 0–5 p.s.i.g.; adsorbing said n-butene in said adsorption zone and withdrawing a stream containing less than about 0.1 wt. percent of n-butenes from said adsorption zone; heating said adsorption zone to a temperature of 400–750° F., simultaneously desorbing said n-butenes cooling said adsorption zone to a temperature less than 90° F.; cyclically repeating the above described process for at least a total of three cycles; subsequently increasing the pressure of said adsorption step to 10–25 p.s.i.g. and then cyclically continuing the above described process of said adsorption at said increased pressure whereby the adsorption capacity of the adsorption zone is increased by about 60% and the catalytic polymerization activity of the sieve in the adsorption zone for isobutylene is only about 40% of that for fresh sieve.

4. The process for preparing a substantially pure isobutylene stream which comprises introducing a feed consisting essentially of isobutylene and a minor proportion of n-butene into a 5A crystalline aluminum silicate sieve adsorption zone said zone containing said 5A sieve selected from the group consisting of new sieve and freshly regenerated sieve, at a superficial feed velocity of 0.2 to 1.5 ft./sec., in the vapor phase, said adsorption zone being maintained at a temperature below about 150° F. and the pressure in said zone being at 0 to 5 p.s.i.g., adsorbing n-butene in said adsorption zone and withdrawing substantially pure isobutylene.

5. The process for preparing a substantially pure isobutylene stream which comprises introducing a feed consisting essentially of isobutylene and a minor portion of normal butenes into a 5A crystalline aluminum silicate sieve absorption zone said zone containing said 5A sieve selected from the group consisting of new sieve and freshly regenerated sieve at a superficial feed velocity of 0.2–1.5 ft./sec. at a temperature between 80 and 150° F., a feed space velocity of 0.5 to 2 w./h./w., maintaining a pressure in said zone of from 0–5 p.s.i.g., absorbing n-butene in said absorption zone, desorbing said adsorbed n-butene, cyclically repeating the absorption-desorption steps for at least 3 cycles, subsequently increasing the pressure of said absorption steps to 10–25 p.s.i.g., cyclically continuing the process at the increased absorption pressure and withdrawing a substantially pure isobutylene stream.

6. The process for preparing a substantially pure isobutylene stream which comprises introducing a feed, consisting essentially of isobutylene and containing less than about 0.8% n-butene, into a 5A crystalline aluminum silicate sieve absorption zone said zone containing said 5A sieve selected from the group consisting of new sieve and freshly regenerated sieve at a superficial feed velocity of 0.2 to 1.5 ft./sec., in the vapor phase, said absorption zone being maintained at a temperature below about 150° F., and the pressure in said absorption zone being at about 0-5 p.s.i.g., absorbing n-butene in said absorption zone, and withdrawing a substantially pure isobutylene product containing less than about 0.1% n-butene.

References Cited in the file of this patent

UNITED STATES PATENTS

| | | |
|---|---|---|
| 2,870,230 | Scott et al. | Jan. 20, 1959 |
| 2,882,243 | Milton | Apr. 14, 1959 |
| 2,894,998 | Hess et al. | July 14, 1959 |
| 2,899,474 | Richards | Aug. 11, 1959 |
| 2,940,926 | Henke et al. | June 14, 1960 |
| 2,978,407 | Tuttle et al. | Apr. 4, 1961 |
| 3,061,654 | Gensheimer et al. | Oct. 30, 1962 |

OTHER REFERENCES

Barrer: "Separation of Mixtures Using Zeolites as Molecular Sieves," J. Soc. Chem. Ind., May 1945, vol. 64, pages 130–135. (Copy in Scientific Library.)